United States Patent [19]

Inaba et al.

[11] Patent Number: 5,139,865
[45] Date of Patent: Aug. 18, 1992

[54] MAGNETIC RECORDING MEDIUM

[75] Inventors: Hiroo Inaba; Kazuaki Taga; Toshihiko Miura, all of Kanagawa, Japan

[73] Assignee: Fuji Photo Film Co., Ltd., Kanagawa, Japan

[21] Appl. No.: 557,840

[22] Filed: Jul. 26, 1990

[30] Foreign Application Priority Data

Jul. 27, 1989 [JP] Japan .................................. 1-194527

[51] Int. Cl.$^5$ ............................................. G11B 23/00
[52] U.S. Cl. ................................... 428/323; 428/329; 428/694
[58] Field of Search ................ 428/323, 329, 694, 900

[56] References Cited

U.S. PATENT DOCUMENTS 4,784,895 11/1988 Mizuno et al. ...................... 428/900

Primary Examiner—Paul J. Thibodeau
Assistant Examiner—Leszek Kiliman
Attorney, Agent, or Firm—Sughrue, Mion, Zinn, Macpeak & Seas

[57] ABSTRACT

A magnetic recording medium comprising a non-magnetic support having thereon a plurality of magnetic layers each comprising a ferromagnetic powder dispersed in a binder, wherein the layer located within a thickness of 0.5 μm from an uppermost surface of said plurality of magnetic layers and a layer located within a thickness of 0.5 μm above the adjacent non-magnetic support have a higher packing density of ferromagnetic powder than an interlayer interposed therebetween. In a preferred embodiment, the interlayer consists of two layers and there are provided on the non-magnetic support a 1st magnetic layer, a 2nd magnetic layer, a 3rd magnetic layer and a 4th magnetic layer in this order from the non-magnetic support; the sum of the thickness of said 3rd magnetic layer and said 4th magnetic layer being not more than 3.5 μm.

11 Claims, 2 Drawing Sheets

MAGNETIC RECORDING MEDIUM

FIELD OF THE INVENTION

The present invention relates to a magnetic recording medium and more particularly to a magnetic recording medium having improved electromagnetic properties.

BACKGROUND OF THE INVENTION

In recent years, audio cassette tapes have been required which provide a low noise level and well-balanced frequency characteristics which produce excellent output in all frequency bands. Since the recent music sources tend to be digitalized in compact disc or the like for ultrahigh fidelity or extremely low noise, for example, such requirements have grown ever-increasingly in audio cassette tape technology.

Similarly, video tapes have been required to provide a higher video output and a lower noise level.

To this end, it is conventional knowledge that if a ferromagnetic iron oxide powder is used as ferromagnetic powder to be incorporated in a magnetic recording medium, then a lower noise level can be obtained by using a ferromagnetic powder having a short average length in the long axis. However, this approach can reduce the noise level but is lacking in frequency characteristics desired.

In order to significantly improve the frequency characteristics of such a magnetic recording medium, a multi-layer magnetic tape comprising two or three magnetic layers has been proposed. In one example of such a multi-layer magnetic tape, a magnetic layer is designed such that higher coercive force is given, i.e., better high frequency characteristics can be obtained towards the upper layer to provide a high output over all frequency bands (see JP-A-57-154635 and 53-16604 (the term "JP-A" as used herein means an "unexamined published Japanese patent application"). However, this approach is disadvantageous in that since the magnetic layers are definitely dissimilar from each other, the output reproduced therefrom is not uniform over all frequency bands, i.e., shows gradual or sudden drop in its frequency characteristic curve. This problem can be alleviated by addition of more layers which provides for improved frequently response. However, in the light of actual manufacturing considerations, the more layers that are contained in the magnetic tape, then, the more times that coating operations are needed, which increases the production costs.

In another example of such a multi-layer magnetic tape, in addition to the above mentioned consideration of coercive force, a ferromagnetic powder having a short average length in the long axis is incorporated in the upper magnetic layer to lower the noise level while a ferromagnetic powder having a long average length in the long axis is incorporated in the lower magnetic layer to improve the low frequency characteristics as disclosed in JP-A-59-172142.

However, if a ferromagnetic powder having a long average length in the long axis is incorporated in the lower magnetic layer, the surface of the magnetic layer thus obtained exhibits a poorer smoothness than that of a magnetic layer comprising a ferromagnetic powder having a short average length in the long axis. Thus, an upper magnetic layer coated on such a lower magnetic layer is influenced by the poor smoothness of the lower magnetic surface and, the coated upper magnetic layer in turn exhibits a poor smoothness as it replicates the poor smoothness of the underlying layer. Accordingly, though giving some improvement in the frequency characteristics, this approach is disadvantageous in that a poor high frequency response is given in the case of audio tapes and a reduction in sensitivity and an increase in noise cause deterioration in S/N ratio (i.e., signal/noise ratio) in video tapes. In recent years, video tapes have been required to provide a high image quality and an improved tone quality. In order to improve video performance or raise output, higher packing ferromagnetic powders must be used. In order to improve S/N ratio, ferromagnetic powders having a fine particle size must be used. In audio tapes, since the tone can be improved by raising S/N ratio, it has been required to minimize the size of ferromagnetic powder.

However, if a finer ferromagnetic powder is used to provide a better video performance, substantial print through of audio signals occurs, resulting in a pronounced deterioration in tone. Therefore, the lower limit of the particle size of ferromagnetic powder is limited at presently used particle sizes.

The print through of audio signals can be minimized not only by increasing the particle size of the ferromagnetic powder to be used but also by increasing the coercive force of the ferromagnetic powder. However, if the coercive force of ferromagnetic powder is raised, the output at a low frequency range is reduced, resulting in undesirable tone.

SUMMARY OF THE INVENTION

One object of the present invention is to provide a magnetic recording medium having a layered or stratified structure such that even when finely divided ferromagnetic powders are incorporated therein, there occurs little print through of audio signals thereto.

These objects of the present invention are accomplished with a magnetic recording medium comprising a non-magnetic support having thereon a plurality of magnetic layers each comprising a ferromagnetic powder dispersed in a binder, wherein a layer located within a thickness of 0.5 $\mu$m from an uppermost surface of the plurality of magnetic layers and a layer located within a thickness of 0.5 $\mu$m above the adjacent non-magnetic support have a higher packing density of the ferromagnetic powder than an interlayer interposed therebetween. That is, the concentration of ferromagnetic powder is greater in the uppermost and lowermost layers than the interlayer interposed therebetween.

Furthermore, these objects of the present invention are preferably accomplished with such a magnetic recording medium, wherein said interlayer interposed between said layer within a depth of 0.5 $\mu$m under the uppermost surface of said magnetic layers and said layer within a depth of 0.5 $\mu$m above said non-magnetic support consists of two layers and, consequently, there are provided on said non-magnetic support a 1st magnetic layer, a 2nd magnetic layer, a 3rd magnetic layer and a 4th magnetic layer in this order from the non-magnetic support, the sum of the thickness of said 3rd and 4th magnetic layers being not more than 3.5 $\mu$m (preferably 0 7 to 2.5 $\mu$m).

BRIEF DESCRIPTION OF THE INVENTION

By way of example and to make the description more clear, reference is made to the accompanying drawings in which:

FIGS. 1 and 2 show embodiments of the layer construction of the magnetic layer according to the present invention; and FIG. 3 shows a section drawn on the basis of a scanning electron microphotograph of a longitudinal section of an example of the magnetic layer of FIG. 2.

DETAILED DESCRIPTION OF THE INVENTION

The print through of audio signals is a phenomenon in which when a magnetic recording medium is wound, a magnetic flux leaked from a part of the magnetic recording medium magnetizes another part of the magnetic recording medium located thereover or thereunder to produce a weak noise. Thus, the present inventors have conducted extensive studies to provide a method for shielding a magnetic recording medium from a magnetic flux leaked from another part of the magnetic recording medium located thereover or thereunder. As a result, the inventors succeeded in attaining this effect by surrounding a magnetic recording medium by a very thin high packing layer (i.e., a very thin magnetic layer having a high packing density).

Figure 1:
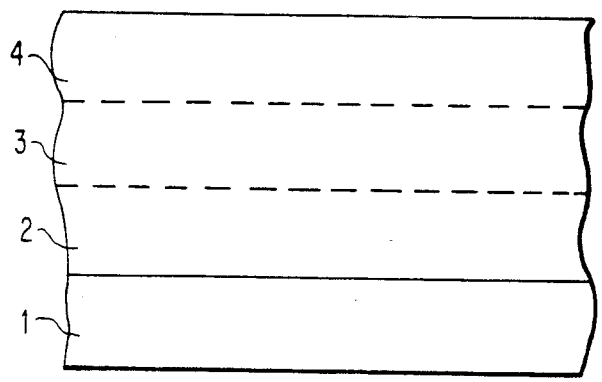

In particular, the internal part of a magnetic recording medium can be prevented from being magnetized due to the print through of audio signals thereto by providing a high packing magnetic layer (i.e., a magnetic layer having a saturated magnetic flux density of preferably 1800 gauss or more) in the vicinity of the surface of the magnetic layer and in the interface of the magnetic layer with the non-magnetic support as shown in FIG. 1.

More particularly, the shielding effect can be further improved to obtain excellent print through (anti-leak) properties by dividing the interlayer into two layers, i.e., a 2nd magnetic layer and a 3rd magnetic layer having a lower coercive force (Hc) than said 2nd magnetic layer.

In FIG. 1, the high packing layer 2 designated as the 1st magnetic layer preferably has a thickness of 0.5 µm or less (particularly 0.3 µm or less), and the interlayer 3 designated as the 2nd magnetic layer preferably has a thickness of 2 to 7 µm (particularly 2.2 to 6 µm). The high packing layer 4 designated as the 3rd magnetic layer preferably has a thickness of 0.5 µm or less (particularly 0.4 µm or less).

Figure 2:
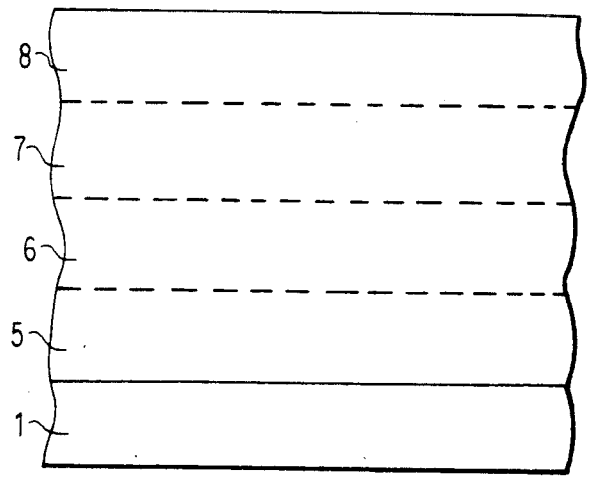

In FIG. 2, the high packing layer 5 designated as the 1st magnetic layer preferably has a thickness of 0.5 µm or less (particularly 0.3 µm or less), and the interlayer 6 designated as the 2nd magnetic layer preferably has a thickness of 0.5 to 4 µm (particularly 0.7 to 2.5 µm). The interlayer 7 designated as the 3rd magnetic layer preferably has a thickness of 0.3 to 3 µm (particularly 0.5 to 2.5 µm), and the high packing layer 8 designated as the 4th magnetic layer preferably has a thickness of 0.5 µm or less (particularly 0.4 µm or less).

Figure 3:
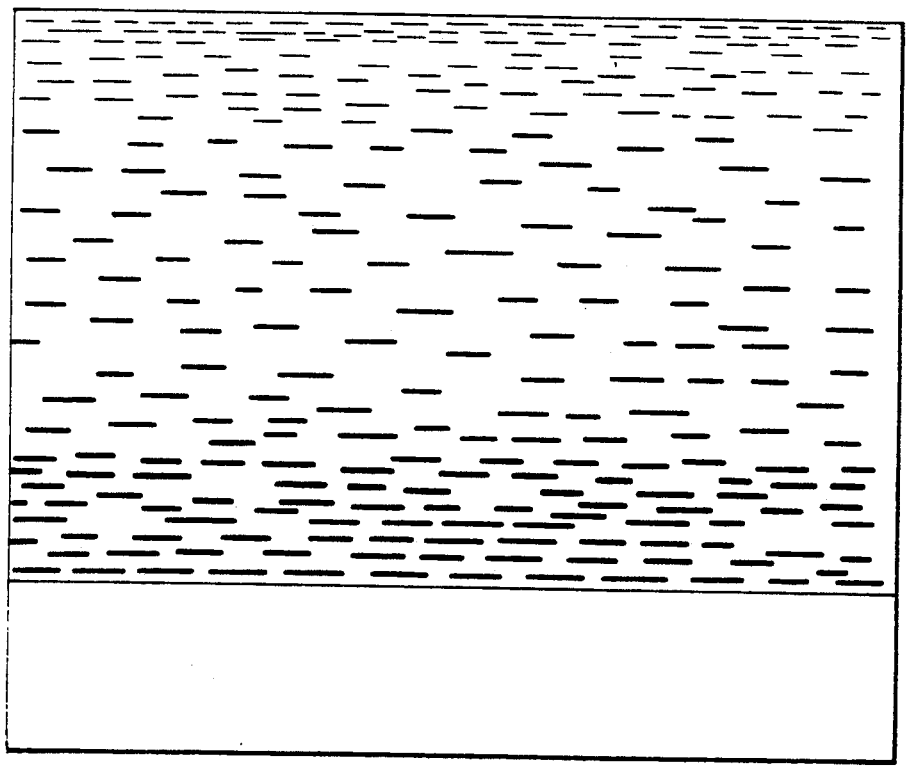

FIG. 3 shows a sectional view drawn on the basis of a 20,000× magnification scanning electron microphotograph of a specimen obtained by cutting an example of the magnetic recording medium as shown in FIG. 2 by means of a microtome in the lengthwise direction and sputtering the section so that a binder is removed therefrom.

The present inventors apprehended that such a magnetic shield effect might prevent a magnetic flux from reaching a magnetic head, causing a reduction in the output. However, it was unexpectedly discovered by the present inventors that such a layer structure causes no output reduction but, instead, produces a high RF output.

The above described layered structures can be obtained by previously preparing magnetic coating solutions having different packing density, and then coating these magnetic coating solutions in a multi-layer construction.

Alternatively, such a layered structure can be obtained by properly designing the drying conditions so that a ferromagnetic powder is localized in the surface of a magnetic layer and in the interface of a base magnetic layer.

In particular, a high packing layer having a small thickness as 0.5 µm or less can be provided on the surface of the magnetic layer and at the interface between the non-magnetic support and the magnetic layer by minimizing the time between coating and drying for removal of organic solvent to an extent such that the surface roughness of the magnetic layer is kept below a certain tolerance value.

More particularly, the drying temperature is in the range of 50° to 110° C., preferably 70° to 100° C.

The wind velocity at the drying air blowing slit is in the range of 3 to 20 m/sec., preferably 4 to 15 m/sec. The drying time is in the range of 1.5 to 12 seconds, preferably 2 to 8 seconds.

The preparation of the magnetic recording medium of the present invention can be accomplished by the following exemplary process.

In particular, a magnetic coating composition is obtained by kneading a ferromagnetic powder in a binder solution which is then coated on a non-magnetic support to form a 1st magnetic layer. An additional magnetic coating composition prepared from a ferromagnetic powder and a binder solution is then coated on the 1st magnetic layer while the 1st magnetic layer is still wet to form a 2nd magnetic layer thereon.

The material coated is then dried while being wet-oriented in a desired direction. After being optionally provided with a backing layer thereon, the material is then supercalendered, and cut into pieces with a desired width and shape to obtain a magnetic recording medium.

As the non-magnetic support to be used in the present invention, suitable film or sheet materials include those containing polyesters such as polyethylene terephthalate (PET) and polyethylene naphthalate, polyolefins such as polypropylene, cellulose derivatives such as cellulose triacetate and cellulose diacetate, vinyl resins such as polyvinyl chloride and polyvinylidene chloride, and synthetic resins such as polycarbonate, polyamide, polyamidoimide and polyimide; foil of non-magnetic metals such as aluminum and copper; foil of metals such as stainless steel; paper; and ceramic sheet.

The magnetic layer in the magnetic recording medium of the present invention is a layer comprising a ferromagnetic powder dispersed in a binder. The ferromagnetic powder to be used in the present invention is not specifically limited. Examples of ferromagnetic powder which can be used in the present invention include known powder of ferromagnetic metals such as $\gamma$-$Fe_2O_3$, Co-containing $\gamma$-$Fe_2O_3$, $Fe_3O_4$, Co-containing $Fe_3O_4$, $CrO_2$, Co-Ni-P alloy, and Fe-Co-Ni alloy.

The magnetic recording medium of the present invention has a coercive force (Hc) of generally 300 to 2,000 Oe, preferably 300 to 1,500 Oe.

If the magnetic layer has a multi-layer construction, the ferromagnetic powder contained in the upper magnetic layer has a $S_{BET}$ value (i.e., a specific surface area measured by the BET method) of generally 30 m²/g or more, preferably 32 to 65 m²/g and a crystallite size of generally 200 to 450 Å, preferably 220 to 400 Å. The ferromagnetic powder contained in the lower magnetic layer has a $S_{BET}$ value of generally 55 m²/g or less, preferably 15 to 50 m²/g and a crystallite size of generally 250 to 700 Å, preferably 270 to 600 Å. The ferromagnetic powder contained in the upper magnetic layer preferably has a coercive force (Hc) of 400 Oe or more, more preferably 550 to 1,100 Oe, while the ferromagnetic powder contained in the lower magnetic layer has a coercive force (Hc) of preferably 1,000 Oe or less, more preferably 300 to 700 Oe.

The binder solution for the magnetic coating composition which can be used in the present invention comprises a resin component, a solvent, and optionally a lubricant and an abrasive agent.

Suitable resin components, known thermoplastic resins, thermosetting resins, or reactive resins or a mixture thereof can be used. Examples of such resin components include vinyl chloride copolymers (e.g., vinyl chloride-vinyl acetate copolymers, vinyl chloride-vinyl acetate-vinyl alcohol copolymers, vinyl chloride-vinyl acetate-acrylic acid copolymers, vinyl chloride-vinylidene chloride copolymers, vinyl chloride-acrylonitrile copolymers, vinyl chloride copolymers containing a polar group such as —$SO_3Na$, —$OSO_3K$, —$PO_3H_2$ and —$SO_2Na$ and an epoxy group), ethylene-vinyl acetate copolymers cellulose derivatives such as nitrocellulose resins, acrylic resins, polyvinyl acetal resins, polyvinyl butyral resins, epoxy resins, phenoxy resins, and polyurethane resins (e.g., polyester polyurethane resins, polyurethane resin containing a polar group such as —$SO_3Na$, —O—$SO_3Na$, —$PO_3H_2$, —$OPO_3H_2$ and —$SO_2Na$, and polycarbonate polyurethane resin).

Particularly preferred among these resins are polar group-containing vinyl chloride copolymers. These polar group-containing vinyl chloride copolymers have a polymerization degree of preferably 150 to 500 and more preferably 200 to 500.

The content of polar group in the copolymer is preferably in the range of $5 \times 10^{-7}$ to $3 \times 10^{-2}$ equivalents and particularly $1 \times 10^{-6}$ to $5 \times 10^{-3}$, per g of the polymer.

Polar group-containing polyurethane resins can also be preferably used. These polar group-containing polyurethane resins preferably have a molecular weight of 30,000 to 300,000 (particularly 40,000 to 100,000) and a polar group content of $5 \times 10^{-7}$ to $3 \times 10^{-2}$ equivalents (particularly $1 \times 10^{-6}$ to $2 \times 10^{-5}$ equivalents) per g of the polymer.

If a hardening agent is needed, a polyisocyanate compound is normally used. As such a polyisocyanate compound there can be selected from those conventionally used as hardening agent component for polyurethane resin.

If hardening is effected by irradiation with electron rays, a compound containing a reactive double bond (e.g., urethane acrylate) can be used.

Examples of solvents which can be used for the magnetic coating composition of the present invention include ketones such as acetone, methyl ethyl ketone, methyl isobutyl ketone, ethyl isobutyl ketone and cyclohexanone; esters such as methyl acetate, ethyl acetate, butyl acetate and glycol monoethyl ether acetate; ethers such as glycol ether, glycol dimethyl ether and dioxane; aromatic hydrocarbons such as benzene, toluene and xylene; and chlorinated hydrocarbons such as methylene chloride, ethylene chloride, carbon tetrachloride, chloroform, ethylene chlorohydrin and dichlorobenzene. These solvents can be used singly or in mixture. Particularly preferred among these solvents are polar solvents such as ketone or solvents containing polar solvents.

In order to prepare the magnetic coating composition, a ferromagnetic powder is uniformly kneaded with and dispersed in a binder solution. In this kneading/dispersion process, the ferromagnetic powder is subjected to previous-dispersion by means of a two-roll mill, three-roll mill, open kneader, pressure kneader, continuous kneader or the like and then subjected to post-dispersion by means of a sand grinder, ball mill or the like.

The magnetic coating composition thus prepared may contain any of various additives such as abrasive agents, lubricants, dispersing agents and anti-static agents in a conventional manner, if desired.

The coating of the magnetic coating composition can be accomplished by an air doctor coating method, a blade coating method, a rod coating method, an extrusion coating method, an air knife coating method, a squeeze coating method, a dip coating method, a reverse roll coating method, a transfer roll coating method, a gravure coating method, a kiss coating method, a cast coating method, a spray coating method, a spin coating method or comparable processes. These coating methods are further described in "Coating Kogaku (Coating Engineering)", pp. 253-277, published by Asakura Shoten, Mar. 20, 1971.

If the magnetic layer has a multi-layer construction, a so-called wet-on-wet coating method can be preferably employed. That is, the upper layer coating composition can be coated on the lower layer coating composition film while the lower layer is wet.

The wet-on-wet coating process can be accomplished by a coating method as disclosed in JP-A-61-139929.

The methods for dispersing ferromagnetic powder and binder and the method for coating the magnetic coating composition on a support are further described in JP-A-54-46011 and JP-A-54-21805 in detail.

Optionally the magnetic layer thus coated on the support is subjected immediately to orientation while being dried so that the ferromagnetic powder contained therein is oriented in a desired direction. The magnetic layer thus formed is then dried. In this process, the non-magnetic support is carried at a speed of 10 to 100 m/minute. The drying temperature is controlled to 50° to 110° C. The material thus processed is then optionally surface-smoothed or cut into pieces having a desired shape to prepare the magnetic recording medium of the present invention. The preparation of the present magnetic recording medium is preferably accomplished by a continuous process consisting of surface treatment of filler, kneading/dispersion, coating, heat treatment, calendering, irradiation with radiation (EB) such as electron beam, surface abrasion, and cutting. These steps can be optionally divided into several stages.

In these steps, the temperature and humidity are controlled to 10° to 130° C. and 5 to 20 mg/m³ (as calculated in terms of water content in the air), respectively. This process is further described in JP-B-40-23625 and 39-28368 (the term "JP-B" as used herein means an "examined Japanese patent publication"), and U.S. Pat. No. 3,473,960. The process as disclosed in JP-B-41-13181 is considered to be a basic and important technique in the art.

In the magnetic recording medium prepared according to the present invention, the layer within a depth of 0.5 μm under the uppermost surface of said magnetic layer and the layer within a depth of 0.5 μm above said non-magnetic support have a higher ferromagnetic powder content than an interlayer interposed therebetween so that the maximum magnetic flux (Bm) thereof is increased, resulting in a reduction of the coercive force (Hc). Furthermore, as the ferromagnetic powder used, a ferromagnetic powder having a proper coercive force is selected so that the permeability thereof can be raised. As the permeability increases, the magnetic line of force can permeate through the material more easily, improving the magnetic shield effect. Thus, the magnetic layer can be protected from effects of magnetic lines of force leaked from adjacent magnetic layers so that audio signals are less apt to be leaked to another part of the magnetic recording medium.

This magnetic shield effect is thought to depend on wavelength and the effect is particularly remarkable on audio signals (1 KHz; wavelength recorded: approx. 33μ).

Furthermore, the saturated magnetic flux density (Bm) can be raised by predetermining the coercive force of the ferromagnetic powder contained in the high packing layer in the vicinity of the magnetic layer at a properly high value. Thus, the output of video signal (RF output) can be raised, resulting in an increase in YS/N ratio (signal to noise ratio of brilliance signal of video). In particular, the diamagnetic field of the magnetic layer can be reduced by predetermining the thickness of the magnetic layer as being as thin as 0.5 μm or less to be brought into contact with the video head. Thus, a magnetic recording medium which can produce a higher output can be obtained.

The present invention will be further described in the following examples, but the present invention should not be construed as being limited thereto.

All parts are by weight.

EXAMPLE 1

| Preparation of Magnetic Coating Composition A | |
|---|---|
| Cobalt-modified iron oxide (Hc: 700 Oe; specific surface area ($S_{BET}$): 45 m$^2$/g; crystallite size: 310 Å; particle size (average length in the long axis): 0.17 μm; acicular ratio: 12) | 100 parts |
| Vinyl chloride-vinyl acetate-maleic acid anhydride copolymer (composition ratio: 86:13:1; polymerization degree: 400) | 12 parts |
| Polyester polyurethane resin (containing 1 × 10$^{-4}$ mol/g of carboxyl group) | 6 parts |
| α-Alumina (particle size: 0.3 μm) | 3 parts |
| Carbon black (particle size: 0.3 μm) | 3 parts |
| Carbon black (particle size: 0.10 μm) | 3 parts |
| Butyl stearate | 1 part |
| Stearic acid | 2 parts |
| Butyl acetate | 200 parts |

One lot of the above mentioned coating Composition A was prepared by means of a continuous kneader, and another lot was prepared by means of an open kneader. The two lots were subjected to dispersion in a sand mill. 5 parts of polyisocyanate was added to the dispersions thus obtained. 40 parts of butyl acetate was added to the dispersions. The materials were then filtered out through a filter having an average pore diameter of 1 μm to prepare magnetic coating compositions.

These two coating solutions were then coated on a 15-μm thick polyethylene terephthalate support with a surface roughness at a cut off value of 0.25 mm (i.e., a center-line average roughness defined by HIS B 0601) of 0.01 μm to obtain a dried thickness of 5.0 μm. The materials were then subjected to orientation by a cobalt magnet with a magnetic force of 3,000 G and a solenoid with a magnetic force of 1,500 G while they were wet. After being dried under the conditions set forth in Table 1 below, the materials were then supercalendered and slit into ½ inch wide tapes to prepare video tapes.

The time necessary to complete drying of the magnetic coating compositions was changed by altering the conditions of two drying zones in the manner described in Table 1. The results are set forth in Table 1.

EXAMPLE 2

| Composition of Lower Magnetic Layer (relative to the support layer) | |
|---|---|
| Cobalt-modified iron oxide (Hc: 650 Oe; specific surface area ($S_{BET}$): 35 m$^2$/g; crystallite size: 350 Å; particle size (average length in the long axis): 0.20 μm; acicular ratio: 10) | 100 parts |
| Vinyl chloride-vinyl acetate-maleic acid anhydride copolymer (composition ratio: 86:13:1; polymerization degree: 400) | 10 parts |
| Polyester polyurethane resin | 5 parts |
| Carbon black (particle size: 0.05 μm) | 3 parts |
| Butyl stearate | 1 part |
| Stearic acid | 2 parts |
| Butyl acetate | 200 parts |
| Composition of Upper Magnetic Layer | |
| Cobalt-modified iron oxide Hc: 700 Oe; specific surface area: 48 m$^2$/g; crystallite size: 300 Å; particle size (average length in the long axis): 0.15 μm; acicular ratio: 12) | 100 parts |
| Vinyl chloride-vinyl acetate-maleic acid anhydride copolymer (composition ratio: 86:13:1; polymerization degree: 400) | 12 parts |
| Polyester polyurethane resin (containing 1 × 10$^{-4}$ mol/g of carboxyl group) | 6 parts |
| α-Alumina (particle size: 0.3 μm) | 3 parts |
| Carbon black (particle size: 0.10 μm) | 3 parts |
| Butyl stearate | 1 part |
| Stearic acid | 2 parts |
| Butyl acetate | 200 parts |

For each of the lower layer and upper layer magnetic coating compositions, the compositions were kneaded by means of a continuous kneader and then dispersed by means of a sand mill. 5 parts of polyisocyanate was added to the lower layer coating composition while 6 parts of polyisocyanate was added to the upper layer coating composition. 40 parts of butyl acetate was added to each of the two coating compositions. The materials were then filtered out through a filter having an average pore diameter of 1 μm to prepare magnetic coating compositions for the lower magnetic layer and upper magnetic layer.

The lower magnetic layer coating composition was then coated on a 15 μm thick polyethylene terephthalate support with a surface roughness at a cut off value of 0.25 mm (a center-line average roughness defined by JIS B 0601) of 0.01 μm to obtain a dried thickness of 3.0 μm. Successively, the upper magnetic layer coating composition was immediately coated on the lower magnetic layer to obtain a dried thickness of 1.0 μm. The material was then subjected to orientation by a cobalt magnet with a magnetic force of 3,000 G and a solenoid with a magnetic force of 1,500 G while the two layers were wet. After being dried, the material was then supercalendered and slit into ½ inch wide tapes to prepare video tapes. The time taken until completion of drying of the magnetic coating solutions was altered by altering the drying temperature and wind velocity at two drying zones in the same manner as in Example 1. The results of the evaluations of various properties are set forth in Table 2.

EXAMPLE 3

| Composition of 1st Magnetic Layer | |
|---|---|
| Cobalt-modified iron oxide<br>Hc: 600 Oe; specific surface area: ($S_{BET}$): 20 m²/g; crystallite size: 560 Å; particle size (average length in the long axis): 0.25 μm; acicular ratio: 10) | 100 parts |
| Vinyl chloride-vinyl acetate-maleic acid anhydride copolymer (composition ratio: 86:13:1; polymerization degree: 400) | 3 parts |
| Polyester polyurethane resin | 3 parts |
| Butyl stearate | 1 part |
| Stearic acid | 2 parts |
| Butyl acetate | 200 parts |
| Composition of 2nd Magnetic Layer | |
| Cobalt-modified iron oxide (Hc: 650 Oe; specific surface area ($S_{BET}$): 35 m²/g; crystallite size: 350 Å; particle size (average length in the long axis): 0.20 μm; acicular ratio: 10) | 100 parts |
| Vinyl chloride-vinyl acetate-maleic acid anhydride copolymer (composition ratio: 86:13:1; polymerization degree: 400) | 10 parts |
| Polyester polyurethane resin | 5 parts |
| α-Alumina (particle size: 0.3 μm) | 3 parts |
| Carbon black (particle size: 0.10 μm) | 3 parts |
| Butyl stearate | 1 part |
| Stearic acid | 2 parts |
| Butyl acetate | 200 parts |
| Composition of 3rd Magnetic Layer | |
| Cobalt-modified iron oxide<br>Hc: 700 Oe; specific surface area ($S_{BET}$): 48 m²/g; crystallite size: 300 Å; particle size (average length in the long axis): 0.15 μm; acicular ratio: 12) | 100 parts |
| Vinyl chloride-vinyl acetate-maleic acid anhydride copolymer (composition ratio: 86:13:1; polymerization degree: 400) | 10 parts |
| Polyester polyurethane resin (containing 1 × 10⁻⁴ mol/g of carboxyl group) | 5 parts |
| Carbon black (particle size: 0.05 μm) | 3 parts |
| α-Alumina (particle size: 0.3 μm) | 3 parts |
| Butyl stearate | 1 part |
| Stearic acid | 2 parts |
| Butyl acetate | 200 parts |
| Composition of 4th Magnetic Layer | |
| Cobalt-modified iron oxide (Hc: 700 Oe; specific surface area ($S_{BET}$): 48 m²/g; crystallite size: 300 Å; particle size (average length in the long axis): 0.15 μm; acicular ratio: 12) | 100 parts |
| Vinyl chloride-vinyl acetate-maleic acid anhydride copolymer | 8 parts |

| -continued | |
|---|---|
| (composition ratio: 86:13:1; polymerization degree: 400) | |
| Polyester polyurethane resin (containing 1 × 10⁻⁴ mol/g of carboxyl group) | 4 parts |
| α-Alumina (particle size: 0.3 μm) | 3 parts |
| Butyl stearate | 1 part |
| Stearic acid | 2 parts |
| Butyl acetate | 200 parts |

In the preparation of the above described 1st, 2nd, 3rd and 4th coating compositions, the 1st and 4th magnetic layer components were each kneaded by means of a continuous kneader, and the 2nd and 3rd magnetic layer components were each kneaded by means of an open kneader. These four materials were each subjected to dispersion in a ball mill. 5 parts of polyisocyanate was added to the coating composition for the 1st and 2nd magnetic layers while 6 parts of polyisocyanate was added to the coating composition for the 3rd and 4th magnetic layers. 40 parts of butyl acetate was added to each of the four coating compositions. The materials were then filtered out through a filter having an average pore diameter of 1 μm to prepare magnetic coating compositions for the 1st, 2nd, 3rd and 4th magnetic layers.

These magnetic layer coating compositions were then simultaneously coated on a 15 μm thick polyethylene terephthalate support with a surface roughness (a center-line average roughness defined by JIS B 0601) of 0.01 μm to obtain desired dried thickness respectively. The material was then subjected to orientation by a cobalt magnet with a magnetic force of 3,000 G and a solenoid with a magnetic force of 1,500 G while these layers were wet. After being dried, the material was then supercalendered and slit into ½-inch wide tapes to prepare video tapes.

The saturated magnetic flux of each of magnetic layers coated were as follows:

| | Saturated magnetic flux (Bm) | Coercive force Hc |
|---|---|---|
| 1st Magnetic layer | 2210 gauss | 550 Oe |
| 2nd Magnetic layer | 1780 gauss | 620 Oe |
| 3rd Magnetic layer | 1600 gauss | 685 Oe |
| 4th Magnetic layer | 1860 gauss | 660 Oe |

The results of these examples are set forth in Table 3.

EVALUATION METHOD

Confirmation of Presence of High Packing Layer

A video tape specimen is cut in the lengthwise direction (direction of greatest extent). The section of a magnetic layer thus obtained is then sputtered so that a binder is removed therefrom. The section is observed under a scanning electron microscope at a 20,000× magnification.

Print through of Audio Signals

A 1 KHz sine wave signal is recorded on a video tape specimen at a level 10 dB higher than the specified input level in the following described manner. The video tape specimen is then allowed to stand at a temperature of 30°±0.5° C. over 48 hours. The level of the output reproduced from the video tape specimen and the level of the maximum print through signal on the signal-free portion which has passed through a 1 KHz band filter are measured. The print through of audio signals is then determined by the following magnetic recording medium equation:

Print through (dB) = $A - B$

A: Level (dB) of 1 KHZ output reproduced from recorded signal;
B: Level (dB) of maximum print through signal Running direction of tape →

| No signal | 1 KHz input | No signal | 1 KHz input |
|---|---|---|---|
| ← → | ← → | ← → | ← → |
| Reel makes about 10 revolutions | Reel makes 1 or less revolution | Reel makes about 10 revolutions | Reel makes 1 or less revolution |
| ←Repeated several times→ | | | |

RF Output

A video signal with an image signal 50IRE is recorded on a video tape specimen with a standard recording current. The average envelope of the RF output reproduced is measured by an oscilloscope. The RF output is determined by the following equation:

RF output (dB) = $20 \log_{10} V/V_0$

V: average value;
$V_0$: reference value

YS/N

The difference in YS/N ratio between a video tape specimen and FUJIFILM Super AG T-120 as a standard video tape is determined by means of a noise meter (925R, manufactured by Shibasoku K. K.). As a VTR, AG-6800 manufactured by Matsushita Electric Industrial Co., Ltd. is used).

Diameter (Average Length in the Long Axis) of Ferromagnetic Powder

The average particle diameter of ferromagnetic powder of average length in the long axis is determined under a transmission electron microscope.

Crystallite Size

The crystallite size of ferromagnetic powder is determined from the spread of the half value width of diffraction line obtained by X-ray diffraction on (4,4,0) plane and (2,2,0) plane.

TABLE 1
(Example 1)

| No. | Specimen | 1* | 2* | 3* | 4 | 5 | 6 | 7 |
|---|---|---|---|---|---|---|---|---|
| 1 | 1st zone temp. (°C.) | 75 | 85 | 95 | 45 | 45 | 45 | 120 |
| 2 | 2nd zone temp. (°C.) | 100 | 100 | 110 | 25 | 45 | 45 | 150 |
| 3 | 1st zone wind velocity (m/sec) | 5.5 | 6.8 | 8.9 | 2 | 2 | 2 | 15 |
| 4 | 2nd zone wind velocity (m/sec) | 8 | 11 | 11 | 2 | 2 | 4 | 25 |
| 5 | Time until drying (sec) | 8 | 4 | 2 | 100 | 25 | 15 | 1 |
| 6 | Presence of high packing in upper layer | Yes | Yes | Yes | No | No | No | Yes |
| 7 | Presence of high packing layer in base-magnetic layer interface | Yes | Yes | Yes | No | No | Yes | Yes |
| 8 | Print through (dB) | −51 | −52 | −52.5 | −45 | −47 | −47 | −52.5 |
| 9 | RF output | +2.8 | +2.9 | +2.6 | +3.0 | +3.0 | +3.1 | +0.5 |
| 10 | YS/N | +2.6 | +2.5 | +2.3 | +3.1 | +3.0 | +2.8 | +0.2 |

*Invention

TABLE 2
(Example 2)

| No. | Specimen | 8* | 9* | 10* | 11 | 12 | 13 | 14 |
|---|---|---|---|---|---|---|---|---|
| 1 | 1st zone temp. (°C.) | 75 | 85 | 95 | 25 | 45 | 45 | 110 |
| 2 | 2nd zone temp. (°C.) | 100 | 100 | 110 | 25 | 45 | 45 | 150 |
| 3 | 1st zone wind velocity (m/sec) | 5.5 | 6.8 | 8.9 | 2 | 2 | 2 | 15 |
| 4 | 2nd zone wind velocity (m/sec) | 8 | 11 | 11 | 2 | 2 | 4 | 25 |
| 5 | Time until drying (sec) | 8.3 | 4.7 | 2.5 | 112.4 | 23.9 | 16.3 | 1.2 |
| 6 | Presence of high packing in upper layer | Yes | Yes | Yes | No | No | No | Yes |
| 7 | Presence of high packing layer in base-magnetic layer interface | Yes | Yes | Yes | No | No | Yes | Yes |
| 8 | Print through (dB) | −54 | −53 | −53 | −44 | −46 | −46.5 | −55 |
| 9 | RF output | +3.6 | +3.6 | +3.7 | +3.8 | +3.8 | +3.7 | +0.2 |
| 10 | YS/N | +4.5 | +4.4 | +4.6 | +4.8 | +4.8 | +4.5 | −0.1 |

*Invention

TABLE 3
(Example 3)

| No. | Specimen | 15* | 16* | 17* | 18* | 19 | 20 | 21 |
|---|---|---|---|---|---|---|---|---|
| 1 | Thickness of 1st magnetic layer | 0.1 | 0.5 | 0.1 | 0.1 | 0 | 0.5 | 0 |
| 2 | Thickness of 2nd magnetic layer | 1.8 | 1.5 | 2 | 0.8 | 2 | 1.5 | 3.2 |
| 3 | Thickness of 3rd magnetic layer | 2 | 1.5 | 3 | 3 | 2 | 2 | 2 |
| 4 | Thickness of 4th magnetic layer | 0.1 | 0.5 | 0.1 | 0.1 | 0 | 0 | 1 |
| 5 | Total thickness of magnetic layers | 4 | 4 | 5.2 | 4 | 4 | 4 | 5.2 |
| 6 | Print through (dB) | −52.5 | −53.4 | −52 | −53.2 | −47.6 | −48.3 | −48.3 |
| 7 | Rf output | +3.2 | +3.5 | +3.2 | +3.3 | +1.5 | +1.6 | +3.5 |
| 8 | YS/N | +3.1 | +3.2 | +3.2 | +3.0 | +1.1 | +1.3 | +3.3 |

*Invention

As is apparent from the results of Table 1 for Example 1, Specimens 1*, 2* and 3* provide excellently preferred magnetic recording media which satisfy both the desired print through (anti-leak) properties and video electromagnetic properties, while Specimens 4, 5 and 6, which were subjected to protracted drying times do not contain a sufficiently cognizable high packing layer formed thereon and exhibit poor print through properties. Specimen 7 has a high packing layer formed thereon but shows great surface roughness, i.e., orange peel surface at many points on the magnetic layer, due to very rapid drying.

As is apparent from the results of Table 2, the drying conditions in Example 2 are the same as used in Example 1. The results of Example 2 are substantially the same as that of Example 1. Specimens 8*, 9* and 10* have a high packing layer formed thereon and exhibit excellent print through properties and video electromagnetic properties. Specimens 11, 12 and 13 don't have a sufficiently cognizable high packing layer formed thereon and thus have poor print through properties. Specimen 14 shows substantial surface defects due to very rapid drying conditions and thus exhibits poor video electromagnetic properties.

As is apparent from the results of Table 3 for Example 3, Specimens 15*, 16*, 17* and 18* provide excellent results in both print through properties and video electromagnetic properties. On the other hand, Specimens 19 and 20 have no upper high packing layers and thus exhibit poor video electromagnetic properties and poor print through properties. Specimen 21 has a thick upper high packing layer and thus is very excellent in video electromagnetic properties but exhibits poor print through properties due to the absence of lower high packing layer.

While the invention has been described in detail and with reference to specific embodiments thereof, it will be apparent to one skilled in the art that various changes and modifications can be made therein without departing from the spirit and scope thereof.

what is claimed is:

1. A magnetic recording medium comprising a non-magnetic support having thereon a plurality of magnetic layers each comprising a ferromagnetic powder dispersed in a binder comprising a resin component selected from the group consisting of a thermoplastic resin, a thermosetting resin, a reactive resin, or combinations thereof, wherein a layer located within a thickness of 0.5 $\mu$m from an uppermost surface of said plurality of magnetic layers and a layer located within a thickness of 0.5 $\mu$m above the adjacent non-magnetic support have a higher packing density of the ferromagnetic powder than an interlayer interposed therebetween.

2. The magnetic recording medium as in claim 1, wherein said interlayer consists of two layers and there are provided on said non-magnetic support a 1st magnetic layer, a 2nd magnetic layer, a 3rd magnetic layer and a 4th magnetic layer in this order from the non-magnetic support; the sum of the thickness of said 3rd magnetic layer and said 4th magnetic layer being not more than 3.5 $\mu$m.

3. The magnetic recording medium as in claim 1, wherein the binder is a polar group-containing vinyl chloride copolymer.

4. The magnetic recording medium as in claim 2, wherein said second magnetic layer has a thickness of 0.5 $\mu$m to 4 $\mu$m and said third magnetic layer has a thickness of 0.3 $\mu$m to 3 $\mu$m.

5. The magnetic recording medium as in claim 1, wherein the ferromagnetic powder is selected from the group consisting of $\gamma$-$Fe_2O_3$, Co-containing $\gamma$-$Fe_2O_3$, $Fe_3O_4$, Co-containing $Fe_3O_4$, $CrO_2$, Co-Ni-P alloy and Fe-Co-Ni alloy.

6. The magnetic recording medium as in claim 1, wherein the magnetic recording medium has a coercive force Hc of 300 Oe to 2,000 Oe.

7. The magnetic recording medium as in claim 1, wherein said interlayer has a thickness of 2 $\mu$m to 7 $\mu$m.

8. The magnetic recording medium as in claim 2, wherein said second magnetic layer has a thickness of 0.5 $\mu$m to 4 $\mu$m.

9. The magnetic recording medium as in claim 2, wherein said third magnetic layer has a thickness of 0.3 to 3 $\mu$m.

10. The magnetic recording medium as in claim 1, wherein the ferromagnetic powder contained in the upper magnetic layer has a $S_{BET}$ value of 30 m$^2$/g or more, a crystallite size of 200 Å to 450 Å and a coercive force Hc of 400 Oe or more.

11. The magnetic recording medium as in claim 1, wherein the ferromagnetic powder contained in the lower magnetic layer has a $S_{BET}$ value of 55 m$^2$/g or less, a crystallite size of 250 Å to 700 Å and a coercive force Hc of 1000 Oe or less.

* * * * *